(12) United States Patent
Ballard et al.

(10) Patent No.: US 9,303,784 B2
(45) Date of Patent: Apr. 5, 2016

(54) MINIMUM PRESSURE AND SHUTOFF VALVE

(71) Applicants: Peter M. Ballard, Enfield, CT (US); Chris Bonn, Hartford, CT (US)

(72) Inventors: Peter M. Ballard, Enfield, CT (US); Chris Bonn, Hartford, CT (US)

(73) Assignee: HAMILTON SUNSTRAND CORPORATION, Windsor Locks, CT (US)

( * ) Notice: Subject to any disclaimer, the term of this patent is extended or adjusted under 35 U.S.C. 154(b) by 619 days.

(21) Appl. No.: 13/630,244

(22) Filed: Sep. 28, 2012

(65) Prior Publication Data
US 2014/0090393 A1 Apr. 3, 2014

(51) Int. Cl.
| F16K 15/06 | (2006.01) |
| F16K 37/00 | (2006.01) |
| F02C 7/232 | (2006.01) |
| F16K 11/07 | (2006.01) |

(52) U.S. Cl.
CPC .............. *F16K 37/0033* (2013.01); *F02C 7/232* (2013.01); *F16K 11/07* (2013.01); *F16K 37/0041* (2013.01); *Y10T 137/0379* (2015.04); *Y10T 137/8671* (2015.04)

(58) Field of Classification Search
CPC .... F16K 17/065; F16K 37/0041; F16K 11/07; F16K 37/0033
USPC ............... 137/540, 535, 543.21, 543.19, 528, 137/494, 516.25
See application file for complete search history.

(56) References Cited

U.S. PATENT DOCUMENTS

| 1,150,743 | A | * | 8/1915 | Butts ......................... 137/516.29 |
| 2,305,519 | A | * | 12/1942 | Dunmire ....................... 137/538 |
| 5,172,716 | A | | 12/1992 | Paptzun |
| 5,236,002 | A | | 8/1993 | Martin et al. |
| 5,238,022 | A | | 8/1993 | Zink |
| 6,357,467 | B1 | | 3/2002 | Ringer |
| 6,443,180 | B1 | | 9/2002 | Samuelson et al. |
| 6,899,129 | B2 | | 5/2005 | Jannotta |
| 6,988,509 | B2 | | 1/2006 | Frampton et al. |

* cited by examiner

*Primary Examiner* — Kevin Lee
*Assistant Examiner* — P. Macade Nichols
(74) *Attorney, Agent, or Firm* — Cantor Colburn LLP

(57) ABSTRACT

An apparatus and method for controlling a pressure drop of a fluid is disclosed. A sleeve includes a plurality of flow passages in a wall of the sleeve. A member slides relative to the sleeve to reveal at least a portion of the plurality of flow passages to control flow of the fluid through the flow passages. The plurality of flow passages are at azimuthally-and axially-staggered locations around the sleeve.

17 Claims, 5 Drawing Sheets

MINIMUM PRESSURE AND SHUTOFF VALVE

BACKGROUND

The present disclosure relates to valves, and more specifically, to valves providing a controlled throughput of fluid flow.

Gas turbine engines rely on the ingestion and combustion of fuel to produce propulsion. An exemplary gas turbine engine includes a combustor and a fuel pump and control system that provides fuel to the combustor. The fuel pump generally includes components, such as a minimum pressurizing valve, that function effectively under a selected fuel pressure profile. The general profile of a minimum pressurizing valve of the fuel pump may affect the performance of the fuel pump, and therefore the performance of the gas turbine engine. As new engines are being designed for improved performance, fuel consumption and range, the importance of a minimum pressure profile has become known. Thus, minimum pressure valve design is directed to providing a suitable pressure profile to the fuel pump to maximize engine performance.

SUMMARY

According to one embodiment of the present disclosure, an apparatus for controlling a pressure drop of a fluid includes: a sleeve having a plurality of flow passages in a wall of the sleeve; and a member configured to slide relative to the sleeve to reveal at least a portion of the plurality of flow passages to control a pressure drop of the fluid through the flow passages; wherein the plurality of flow passages are at azimuthally-staggered locations around the sleeve.

According to another embodiment, an apparatus for providing fuel to a gas turbine engine includes: a housing having a fuel inlet configured for ingress of the fuel into the housing and a fuel outlet configured for egress of the fuel from the housing to the gas turbine engine; a sleeve having a plurality of passages in a wall of the sleeve at azimuthally-staggered locations around the sleeve, wherein fuel flows from the fuel inlet to the fuel outlet through at least one of the plurality of flow passages; and a member configured to slide relative to the sleeve to control an opening of the plurality of flow passages to control a pressure drop of the fuel to the engine.

According to another embodiment, a method for controlling a pressure drop of a fluid, comprising: flowing the fluid through at least one of a plurality of flow passages in a wall of a sleeve, wherein the plurality of passages are located at azimuthally-staggered locations around the sleeve; and controlling a displacement of a member relative to the at least one of the plurality of flow passages to control the pressure drop of the fluid.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
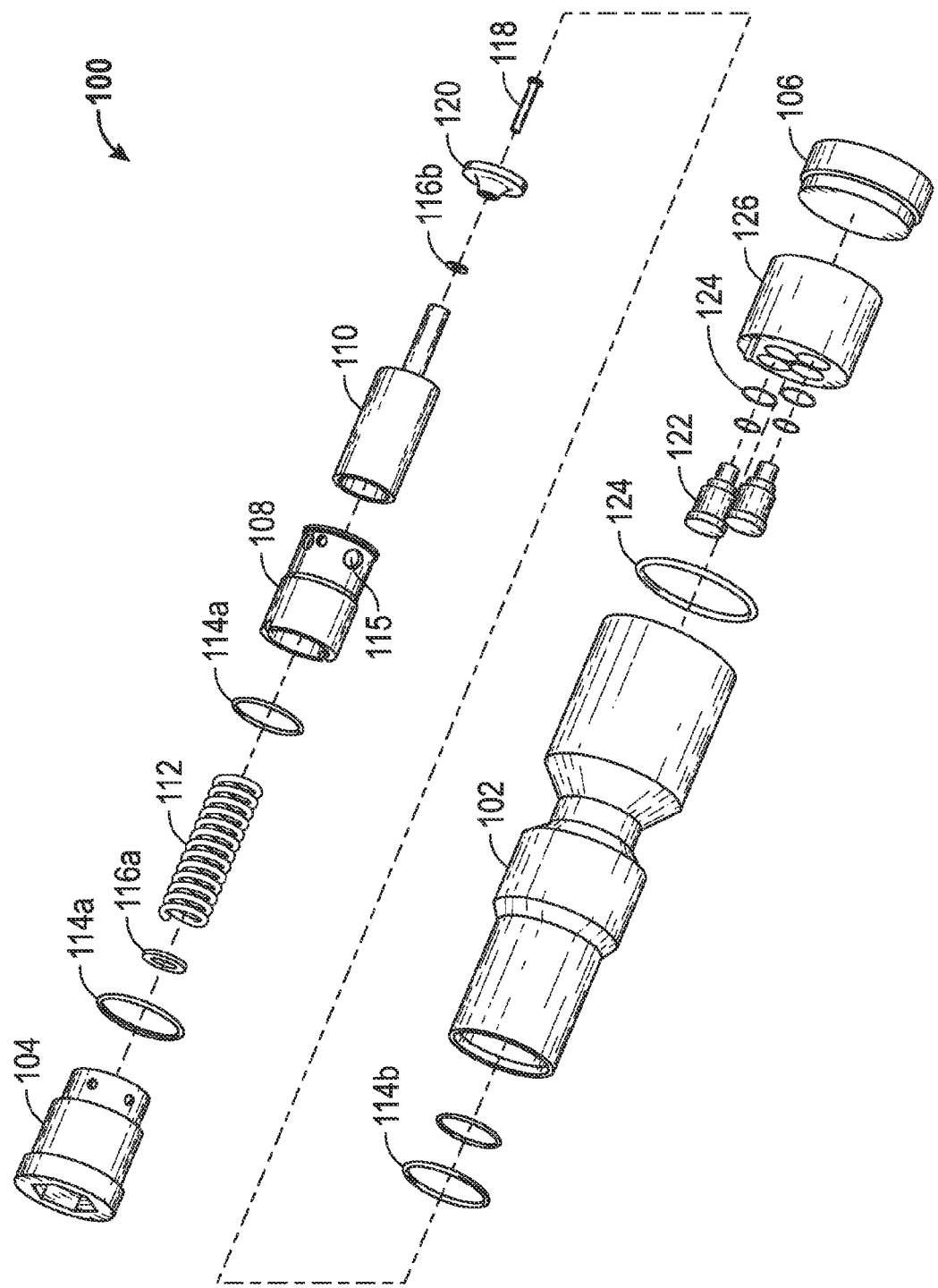
FIG. 1 shows an exploded view of an exemplary valve of the present disclosure.

FIG. 1 shows an exploded view of an exemplary valve 100 of the present disclosure. The exemplary valve 100 may be used to control a pressure drop of fuel to an engine, such as a gas turbine engine. In one embodiment, the exemplary valve 100 may be configured to provide fluid flow according to a specified profile and provide a zero-leak shutoff condition at fluid pressures below a selected pressure.

Figure 2:
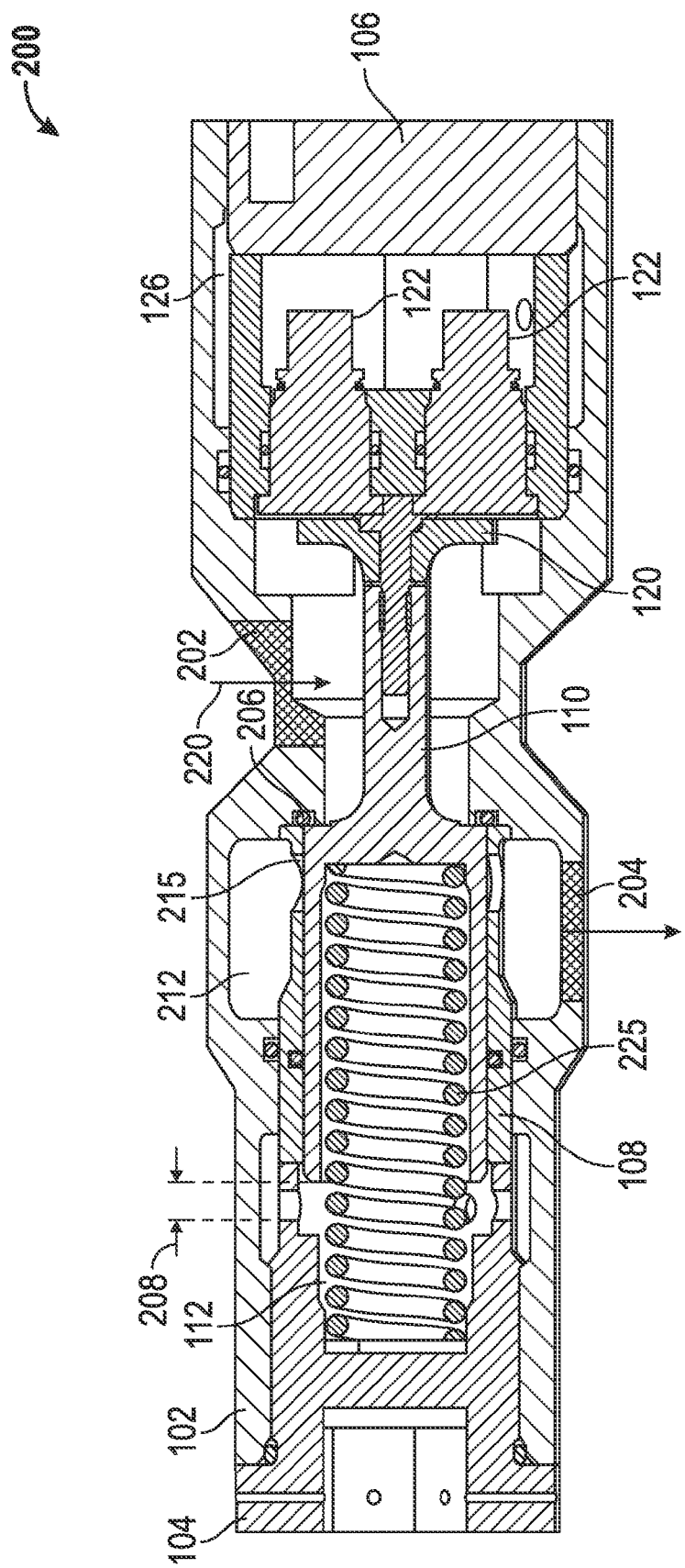
FIG. 2 shows an assembly cross-sectional view of the exemplary valve of FIG. 1.

The exemplary valve 100 includes a housing 102 that is generally a cylindrical shell having a longitudinal axis and that includes at least a fuel inlet 202 and a fuel outlet 204 (shown in FIG. 2). Fuel that enters the housing 102 at the fuel inlet 202 traverses an interior of the housing 102 via the methods described herein to exit the housing 102 at the fuel outlet 204. The housing 102 is mechanically coupled to a valve cap 104 at one axial end and a proximity probe cap 106 at another axial end to provide a leak-tight chamber in the housing 102. Various seals 114a and 114b (shown as O-rings) seal the coupling between the valve cap 104 and the housing 102. The valve cap 104 secures a sleeve 108 within the housing 102. The sleeve 108 is a generally cylindrical shell substantially axially aligned with the longitudinal axis of the housing 102 and includes one or more flow passages 115 formed along a wall of the sleeve 108. A member such as exemplary spool 110 is slidably secured in the housing 102 and is configured to slide relative to the sleeve 108 substantially along a longitudinal axis of the sleeve 108. An outer diameter of the spool 110 is approximately the same as or slightly smaller than an inner diameter of the sleeve 108. As the spool 110 slides along the longitudinal axis of the sleeve 108, one or more flow passages 115 formed in the sleeve 108 are covered or uncovered based on the relative position between the spool 110 and the sleeve 108. The spool 110 therefore opens or closes or partially opens flow passages 115 based on its axial position relative to the sleeve 108. Spring 112 is secured in the housing 102 and is configured to apply a spring force against the spool 110. In one embodiment, optional shim 116a provides support between the spring 112 and the valve cap 104. The applied spring force biases the spool 110 into a closed position away from the valve cap 104. In the closed position, the spool 110 covers the one or more flow passages 115 and prevents fuel flow through the valve 100.

In the illustrated embodiment, one or more proximity probes 122 are disposed in a proximity probe housing 126 that is secured to the housing 102 by the proximity probe cap 106. Various O-seals 124 may be used to provide a leak-tight seal between the proximity probe housing 126 and the housing 102. A bolt 118 and shim 116b secure a target 120 onto an end of the spool 110 away from the spring 112. Target 120 may include a material having a magnetic field. As the spool 110 and target 120 nears the one or more proximity probes 122, the magnetic field of the target 120 may be detected by the one or more proximity probes 122 and a position such as a closed position of the spool 110 may thereby be determined.

FIG. 2 shows an assembly cross-sectional view 200 of the exemplary valve 100. The cross-sectional view 200 includes the housing 102, valve cap 104 and proximity probe cap 106. Spool 110 is shown in a position relative to sleeve 108. Spool 110 is shown having an open cavity 225 oriented towards the valve cap 104. At least a portion of spring 112 is disposed within the cavity 225 of the spool 110. Target 120 and proximity probes 122 are also shown.

Cross-sectional view 200 further shows a fuel inlet 202 and a fuel outlet 204 of the housing 102. Metered fuel flow 220 enters the housing 102 through the fuel inlet 202 and out of the housing 102 through the fuel outlet 204. As shown in FIG. 2, the spool 110 is forced into a closed position and blocks any passage of fuel from the fuel inlet 202 to the fuel outlet 204. In the closed position, the spool 110 may be forced against an elastomeric seal 206 to form a leak-tight seal preventing flow of fluid from the fuel inlet 202 to the fuel outlet 204. Spring 112 and a gear pump inlet pressure 208 supply a force that biases the spool 110 into the closed position. The fluid pressure of the metered fuel 220 at the fluid inlet 202 supplies a force opposing the force of the spring 112 and the gear pump inlet pressure 208. As the pressure of the metered fuel 220 increases to a selected pressure level, the force applied by the metered fuel 220 becomes greater than the force applied by spring 112 and gear pump inlet pressure 208, causing the spool 110 to move against the spring 112 to uncover the flow passages 215 in the valve sleeve 108. This allows the metered fluid 220 to flow from the fuel inlet 202 into an interior region of the sleeve 108, through the flow passages 215 to a region 212 exterior to the sleeve 108, and exit the valve via the fuel outlet 204. In various embodiments, the fluid exiting the valve is supplied to the fuel nozzles of a gas turbine engine. The pressure drop of the fuel through the flow passages 215, along with the upstream pressure profile, is determined by the spring constant of the spring, sizes of the flow passages 215, axial locations of the flow passages (also referred to herein as "timing"), among other parameters. In various embodiments, the selected pressure level at the inlet 202 for causing the spool 110 to move from its closed position is about 85 pounds per square inch. At pressure levels less than the selected pressure level, the spool 110 remains in a closed position. As the pressure level at the inlet 202 increases above the selected pressure, the spool 110 moves towards the valve cap 104, thereby uncovering flow passages 215 or more portions of the flow passages.

Figure 3:
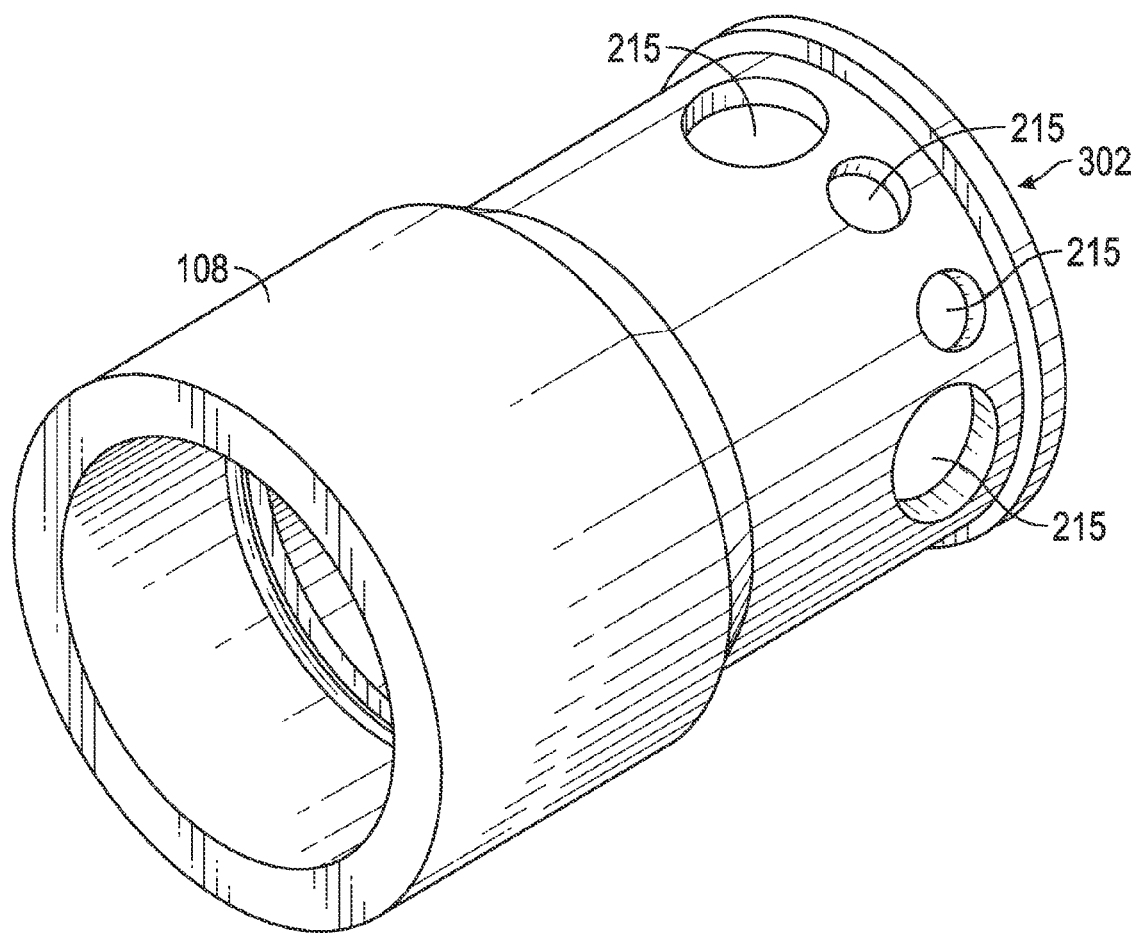
FIG. 3 shows an exemplary sleeve used in the exemplary valve of FIG. 1.

FIG. 3 shows an exemplary sleeve 108 of the valve 100. The exemplary sleeve 108 has an inlet end 302 configured to be disposed near an inlet 202 of the housing 102 and to receive the fuel from the inlet 202. The exemplary sleeve 108 further includes a plurality of flow passages 215 formed in a wall of the sleeve 108. In an exemplary embodiment, the flow passages 215 are circular flow passages and are directed along radial lines extending from a longitudinal axis of the sleeve 108. The flow passages 215 may be of various sizes and diameters. Each flow passage is disposed at a selected distance from the inlet end 302 as measured perpendicularly from an edge of the inlet end 302 to a point on the circumference of the flow passage 215 that is closest to the inlet end. The flow passages are also disposed at various azimuthal locations around the sleeve. In an exemplary embodiment, the flow passages 215 are azimuthally staggered about the sleeve 108. In other words, any two adjacent flow passages define an angular spacing between the flow passages and the total of the angular spacings on the sleeve is described using two or more angles. In another embodiment, the sleeve 108 has a one-fold rotational symmetry.

Figure 4:
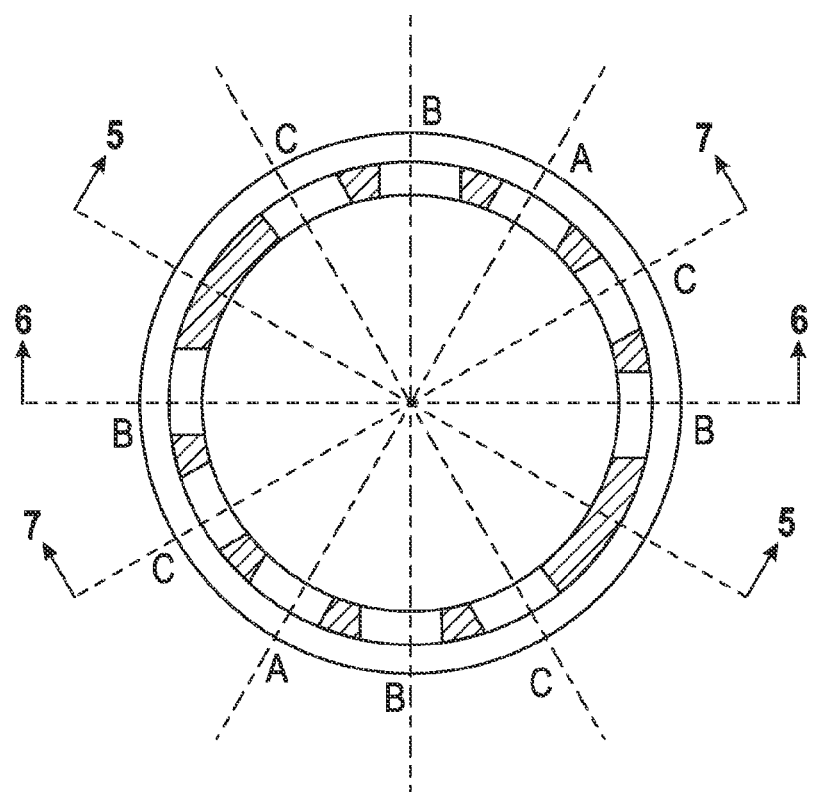
FIGS. 4-7 show various cross-sectional views of the exemplary sleeve of FIG. 3.
Figure 5:
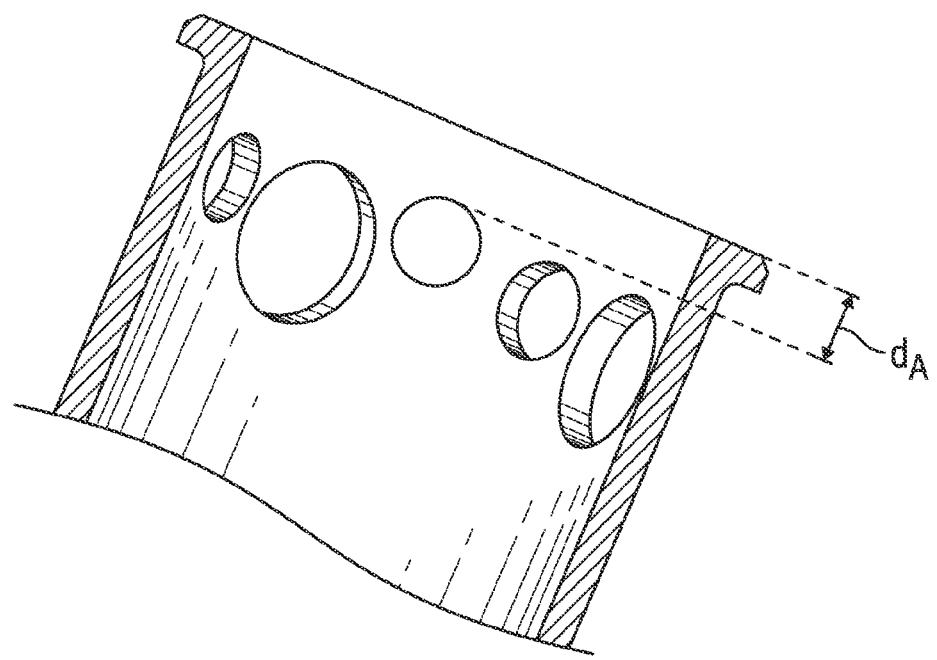
Figure 6:
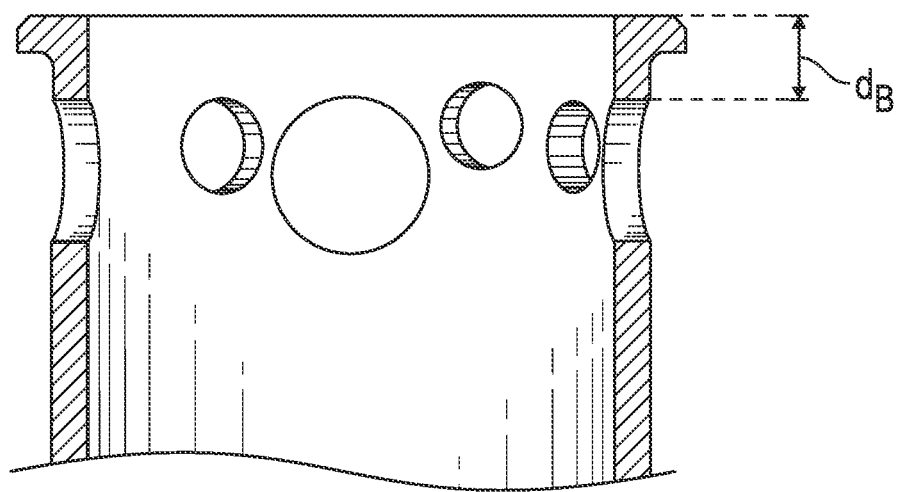
Figure 7:
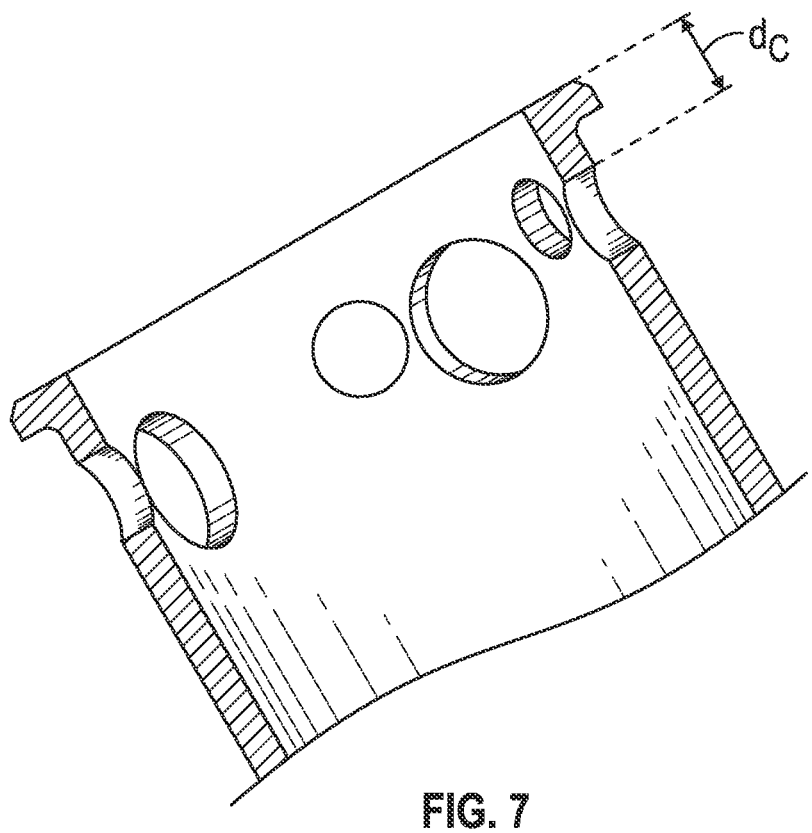

FIG. 4 shows a top cross-sectional view of the sleeve. The sleeve includes ten flow passages characterized by three types. As shown in FIG. 5, the first type of flow passage (Type A) has a diameter of about 0.194 inches and is separated by about 0.145 inches from the inlet end of the sleeve as measured perpendicularly from an edge of the inlet end to a closest point on the circumference of the flow passage. As shown in FIG. 6, the second type of flow passage (Type B) has a diameter of about 0.344 inches and is separated by about 0.182 inches from the inlet end of the sleeve as measured perpendicularly from the edge of the inlet end to the closest point on the circumference of the flow passage. As shown in FIG. 7, the third type of flow passage (Type C) has a diameter of about 0.206 inches and is separated by about 0.188 inches from the inlet end of the sleeve as measured perpendicularly from the edge of the inlet end to the closest point on the circumference of the flow passage. In an exemplary embodiment, the sleeve 108 includes two Type A flow passages, four Type B flow passages and four Type C flow passages. The four Type B flow passages are disposed at 90 degrees azimuthally from one another. The four Type C flow passages are each disposed at 90 degrees azimuthally from one another and at approximately 30 degrees in a counter-clockwise direction from their respect Type B flow passages, as shown in the top cross-sectional view of FIG. 4. The two Type A flow passages diametrically opposed to each other and at approximately 30 degrees clockwise direction from their respective Type B flow passages, as shown in FIG. 4. Thus, the flow passages are azimuthally and axially staggered. In various alternate embodiments, the azimuthal and/or axial location of the flow passages is selected to provide a substantially different pressure drop vs. fluid flow characteristic to the fuel pump upstream. Additionally, the azimuthal locations are selected to maintain or increase the structural integrity of the sleeve. In another embodiment, the sleeve 108 includes a first set of flow passages (such as the Type A flow passages) characterized by a first number of flow passages having a first rotational symmetry and a second set of flow passages (such as the Type B flow passages) characterized by a second number of flow passages having a second rotational symmetry.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the exemplary embodiment to the disclosure has been described, it will be understood that those skilled in the art, both now and in the future, may make various improvements and enhancements which fall within the scope of the claims which follow. These claims should be construed to maintain the proper protection for the disclosure first described.

What is claimed is:

1. An apparatus for controlling a pressure drop of a fluid, comprising:
   a sleeve having a plurality of flow passages in a wall of the sleeve; and
   a member configured to slide relative to the sleeve to reveal at least a portion of the plurality of flow passages to control a pressure drop of the fluid through the plurality of flow passages;
   wherein the plurality of flow passages are at azimuthally-staggered locations around the sleeve and include a first flow passage separated by 0.145 inches from an inlet end of the sleeve, a second flow passage separated by 0.182 inches from the inlet end of the sleeve, and a third flow passages separated by 0.188 inches from the inlet end of the sleeve.

2. The apparatus of claim 1, wherein the each flow passage is characterized by at least one of a diameter of the flow passage, a longitudinal distance of the flow passage from an end of the sleeve, and an azimuthal placement of the flow passage.

3. The apparatus of claim 1, wherein the sleeve has two-fold rotational symmetry.

4. The apparatus of claim 1, further comprising a housing configured to house the sleeve and the member and having a fluid inlet and a fluid outlet, wherein the sleeve receives the fluid from the fluid inlet at an interior region of the sleeve and fluid exits the fluid outlet from an exterior region of the sleeve.

5. The apparatus of claim 1, wherein the first flow passage includes four first flow passages separated azimuthally from each other by approximately 90 degrees, the second flow passage includes four second flow passages separated azimuthally from each other by approximately 90 degrees wherein each of the second flow passages is located substantially 30 degrees counter-clockwise from a first flow passage, and the third flow passage includes two third flow passages separated azimuthally from each other by approximately 180 degrees wherein each of the third flow passages is located substantially 30 degrees clockwise from a first flow passage.

6. The apparatus of claim 1, wherein the first flow passage has a diameter of 0.194 inches, the second flow passage has a diameter of 0.344 inches and the third flow passage has a diameter of 0.206 inches.

7. The apparatus of claim 1, wherein a total of the angular spacings between adjacent flow passages on the sleeve is described using two or more angles.

8. The apparatus of claim 1, wherein the first flow passage is characterized by a first number of flow passages having a first rotational symmetry and the second flow passage is characterized by a second number of flow passages having a second rotational symmetry.

9. An apparatus for providing fuel to a gas turbine engine, comprising:
   a housing having a fuel inlet configured for ingress of the fuel into the housing and a fuel outlet configured for egress of the fuel from the housing to the gas turbine engine;
   a sleeve having a plurality of passages in a wall of the sleeve at azimuthally-staggered locations around the sleeve, wherein the plurality of flow passages includes a first flow passage separated by 0.145 inches from an inlet end of the sleeve, a second flow passage separated by 0.182 inches from the inlet end of the sleeve, and a third flow passages separated by 0.188 inches from the inlet end of the sleeve, wherein fuel flows from the fuel inlet to the fuel outlet through at least one of the plurality of flow passages; and
   a member configured to slide relative to the sleeve to control an opening of the plurality of flow passages to control a pressure drop of the fuel to the gas turbine engine.

10. The apparatus of claim 9, wherein each flow passage is characterized by a diameter of the flow passage, a longitudinal distance of the flow passage from the end of the sleeve, and an azimuthal placement of the flow passage.

11. The apparatus of claim 9, wherein the first flow passage includes four first flow passages separated azimuthally from each other by approximately 90 degrees, the second flow passage includes four second flow passages separated azimuthally from each other by approximately 90 degrees wherein each of the second flow passages is located substantially 30 degrees counter-clockwise from a first flow passage, and the third flow passage includes two third flow passages separated azimuthally from each other by approximately 180 degrees wherein each of the third flow passages is located substantially 30 degrees clockwise from a first flow passage.

12. The apparatus of claim 9, wherein the first flow passage has a diameter of 0.194 inches, the second flow passage has a diameter of 0.344 inches and the third flow passage has a diameter of 0.206 inches.

13. A method for controlling a pressure drop of a fluid, comprising:
   flowing the fluid through at least one of a plurality of flow passages in a wall of a sleeve, wherein the plurality of passages are located at azimuthally-staggered locations around the sleeve and include a first flow passage separated by 0.145 inches from an inlet end of the sleeve, a second flow passage separated by 0.182 inches from the inlet end of the sleeve, and a third flow passage separated by about inches from the inlet end of the sleeve; and
   controlling a displacement of a member relative to the at least one of the plurality of flow passages to control the pressure drop of the fluid.

14. The method of claim 13, wherein each flow passage is characterized by a diameter of the flow passage, a longitudinal distance of the flow passage from the end of the sleeve, and an azimuthal placement of the flow passage.

15. The method of claim 13, wherein the fluid is fuel, further comprising controlling the pressure drop of the fuel to a gas turbine engine according to a timing of the plurality of flow passages.

16. The method of claim 13, wherein the first flow passage includes four first flow passages separated azimuthally from each other by approximately 90 degrees, the second flow passage includes four second flow passages separated azimuthally from each other by approximately 90 degrees wherein each of the second flow passages is located substantially 30 degrees counter-clockwise from a first flow passage, and the third flow passage includes two third flow passages separated azimuthally from each other by approximately 180 degrees wherein each of the third flow passages is located substantially 30 degrees clockwise from a first flow passage.

17. The method of claim 13, wherein the first flow passage has a diameter of 0.194 inches, the second flow passage has a diameter of 0.344 inches and the third flow passage has a diameter of 0.206 inches.

* * * * *

UNITED STATES PATENT AND TRADEMARK OFFICE
CERTIFICATE OF CORRECTION

PATENT NO.         : 9,303,784 B2
APPLICATION NO.    : 13/630244
DATED              : April 5, 2016
INVENTOR(S)        : Peter M. Ballard and Chris Bonn It is certified that error appears in the above-identified patent and that said Letters Patent is hereby corrected as shown below:

(Item 73) The Assignee is misspelled on title page of Letters Patent;
Sunstrand should be Sundstrand Signed and Sealed this
Twelfth Day of July, 2016

Michelle K. Lee
*Director of the United States Patent and Trademark Office*